(12) United States Patent
Schreiner

(10) Patent No.: US 9,313,952 B1
(45) Date of Patent: Apr. 19, 2016

(54) COTTON PICKER SCRAPPING ARRANGEMENT

(71) Applicant: DEERE & COMPANY, Moline, IL (US)

(72) Inventor: Joel M. Schreiner, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/539,127

(22) Filed: Nov. 12, 2014

(51) Int. Cl.
*A01D 46/16* (2006.01)
*A01D 46/18* (2006.01)

(52) U.S. Cl.
CPC .............. *A01D 46/16* (2013.01); *A01D 46/18* (2013.01)

(58) Field of Classification Search
CPC ........ A01D 46/16; A01D 46/18; A01D 46/14
USPC ..................... 56/26, 36, 40–43, 48
See application file for complete search history.

(56) References Cited

U.S. PATENT DOCUMENTS

| | | | |
|---|---|---|---|
| 2,665,534 A | 1/1954 | Rust | |
| 3,529,409 A | 9/1970 | West | |
| 6,591,597 B1 | 7/2003 | Stueck et al. | |
| 6,672,041 B1 * | 1/2004 | Keeter | A01D 46/18 56/41 |
| 7,360,280 B2 * | 4/2008 | Fox | A01D 46/08 19/66 CC |
| 7,765,781 B1 * | 8/2010 | Ostermeier | A01D 46/18 56/41 |

* cited by examiner

*Primary Examiner* — John G Weiss
(74) *Attorney, Agent, or Firm* — Ingrassia, Fisher & Lorenz PC

(57) ABSTRACT

A scrapping plate arrangement within a cotton picking machine includes a pivotable pressure plate and one or more pivotable scrapping plates. Each scrapping plate may be an assembly that includes a door and a plate member having one or more ribs extending toward a picking drum and configured to pass through respective openings in the pressure plate, permitting each scrapping plate to be positioned selectively into a use orientation.

20 Claims, 9 Drawing Sheets

COTTON PICKER SCRAPPING ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to cotton picking machines, and in particular to scrapping plates for the picker heads of a cotton picker.

BACKGROUND OF THE DISCLOSURE

Self-propelled cotton harvesting machines typically come in two forms, namely cotton stripper vehicles and cotton picker vehicles. Cotton strippers are designed to remove the cotton bolls entirely, or possibly sever the stalk near the surface of the ground and take the entire stalk together with cotton bolls, into the machine. A cotton picker, on the other hand, "picks" the cotton from the bolls, typically by using revolving spindle fingers or prongs. Cotton pickers leave the cotton plant, and unopened bolls, intact, such that a given field is often harvested more than once during a growing season, the pickers making repeated trips through the cotton field as the bolls ripen.

Pressure plates and "scrapping" plates may be added to the picker units to increase the cotton picking efficiency. Scrapping plates, as the name implies, are often added during subsequent runs through a field in order to better allow the cotton picker to pick the remaining cotton or "scraps" from the plant. Some conventional cotton pickers use one or more spring-loaded pressure plates to compress the cotton plant into the revolving picking spindles. Scrapping plates may be added to the pressure plates to create narrow channels surrounding the spindles, thereby increasing the likelihood that the cotton bolls will be exposed to the spindles as the machine travels through the field.

While scrapping plates can increase picking yield, they also can lower the quality of the yield by introducing additional bark, leaves, and other detritus into the accumulator. Therefore, the scrapping plates are typically removed for primary harvesting or otherwise when harvesting conditions are such that the scrapping plates are not needed. One problem with this, however, is that because scrapping plates are typically bolted onto the pressure plates inside the picker header, they can be cumbersome to mount and dismount. Consequently, operators may tend to forgo their use when needed or keep them in place despite being no longer beneficial, or even detrimental.

SUMMARY OF THE DISCLOSURE

This disclosure provides a scrapping arrangement for cotton picking machines. Aspects of the disclosure may facilitate improved operation of scrapping plates as well as the selective use, and control of, scrapping plates at the picking zone.

In one aspect, the disclosure provides a scrapping arrangement for a cotton picking machine with one or more rotating picking drums having a plurality of rotating picker spindles. The scrapping arrangement may include at least one pressure plate mounted to pivot with respect to an associated drum and having at least one slot. At least one scrapping plate may be pivotally mounted with respect to the at least one pressure plate, and have at least one rib extending toward the associated drum configured to pass through the at least one slot in the at least one pressure plate.

In another aspect, the scrapping arrangement may include a pressure plate mounted to pivot with respect to an associated picking drum. The pressure plate may be arranged to extend in a direction of a length of the associated drum and have a plurality of slots spaced apart from one another in the length direction. A plurality of separate scrapping plates may be pivotally mounted with respect to the pressure plate, each of the scrapping plates having at least one rib extending toward the associated drum and configured to pass through the slots in the pressure plate.

In yet another aspect, the scrapping arrangement may include a slotted pressure plate mounted to pivot with respect to an associated picking drum and arranged to extend in the length direction. A plurality of scrapping plates may be pivotally mounted with respect to the pressure plate. Each of the scrapping plates may be an assembly including a door pivotally mounted to the pressure plate and a plate member mounted to the door. Each plate member may have at least one rib extending toward the associated drum and configured to pass through the slots in the pressure plate.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
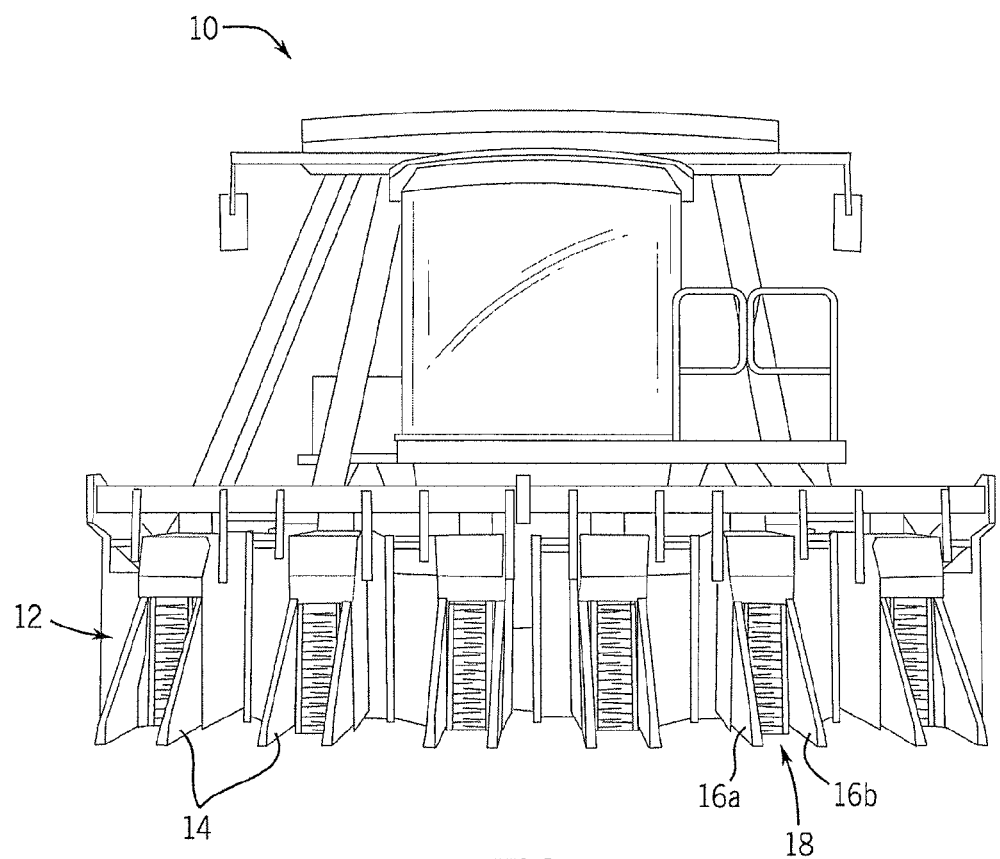
FIG. 1 is a perspective view of an example agricultural vehicle in the form of a cotton picker vehicle having a plurality of cotton picker heads as disclosed herein.

The following describes one or more example embodiments of the disclosed cotton picker and scrapping arrangement, as illustrated with respect to the accompanying figures of the drawings described briefly above. Various modifications to the example embodiments may be contemplated by one of skill in the art.

The disclosure provides a cotton picker vehicle, and cotton picker units therein, having a scrapping arrangement. In one aspect of the disclosure, the scrapping arrangement may include one or more pressure plates and one or more scrapping plates for each picking drum in a picker head. A single pressure plate may be oriented with the length of the associated picking drum, or multiple pressure plates may be arranged together along the length of the drum. Similarly, a single scrapping plate may be oriented with the length of the associated single or multiple pressure plate(s), or multiple scrapping plates may be arranged together along the length of the pressure plate(s). The scrapping arrangement may be permanently incorporated into each picker head such that post-production mounting and dismounting is not required. The system provides an integral scrapping arrangement in which the scrapping plates can be carried along with the cotton picker even when not in use, thus eliminating the need to separately carry, store, and have readily available, scrapping plates in the event that an operator wishes to use them.

The disclosure also may be viewed as providing a scrapping arrangement in which individual scrapping plates may be separately positioned and operated, without affecting one or more of the other scrapping plates of the assembly. This functionality allows discreet sections of spindles to be addressed differently. For example, one or more scrapping plates for an upper section of spindles can be engaged, while one or more scrapping plates for a lower section of spindles can be disengaged. Additionally, the various scrapping plates can be positioned selectively at the same or different intermediate engagement positions. Moreover, individual scrapping plates may be easily replaced. If a single scrapping plate is damaged or otherwise in need or replacement, it can be switched out without needing to replace undamaged plates.

In certain embodiments, the scrapping arrangement may include one or more adjustment mechanisms for modifying the angular position of one or more scrapping plate(s), either individually or collectively, relative to the spindles. The scrapping plates may be adjusted in a binary fashion between engaged and disengaged positions, or they may be continually adjustable across a range of angular displacements relative to a pressure plate so that none, some, or substantially all of the walls or ribs of those scrapping plates may extend beyond a drum-facing side of the pressure plate. This permits customization of the scrapping arrangement, whereby none, some, or all of the scrapping plates in a picker head can be selectively engaged, disengaged, or engaged to various degrees. The operator is thus no longer faced with the undesirable task of mounting or dismounting the scrapping plates in order to operate the cotton picker efficiently for given harvesting conditions.

In certain embodiments, each pressure plate may be spring-loaded to bias toward a position close to the spindles, while being movable away from the spindles when the cotton material passing through the picking units apply a sufficient counterforce to the pressure plate. The scrapping plates may be coupled collectively or individually directly to the pressure plate, such that once a desired offset between the pressure plate and the scrapping plate(s) is determined, the arrangement may keep those elements in the same relative spaced relationship.

Referring now to FIG. 1, a cotton picker vehicle 10 has a header unit 12 including a plurality of picker heads 14 (e.g., six are shown) arranged side-by-side across the front of the vehicle. Each picker head 14 may be identical to the other picker heads, so the internal structure for one picker head will be described below with the understanding that the description also may apply to the other picker heads. Each picker head 14 may include a pair of separators 16a, 16b laterally spaced apart from one another and forming a channel 18 disposed between them. The channels 18 are configured to receive the rows of cotton plants as the cotton picker 10 is driven through a field and, as such, the channels 18 are laterally spaced apart from one another substantially the same distance as the rows of the cotton plants to be picked.

Figure 2:
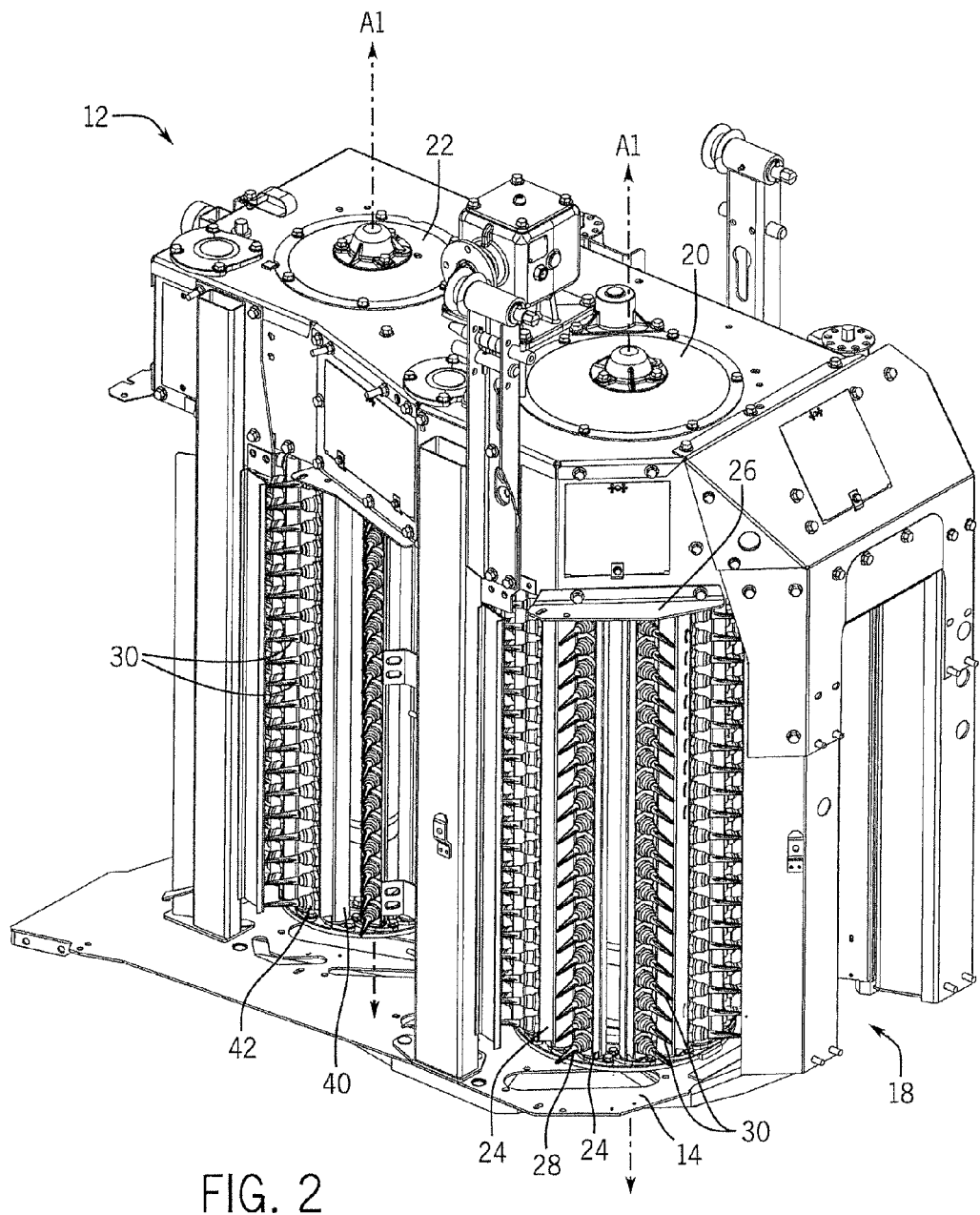
FIG. 2 is a perspective view of a cotton picker head used with the cotton picker vehicle of FIG. 1.
Figure 3:
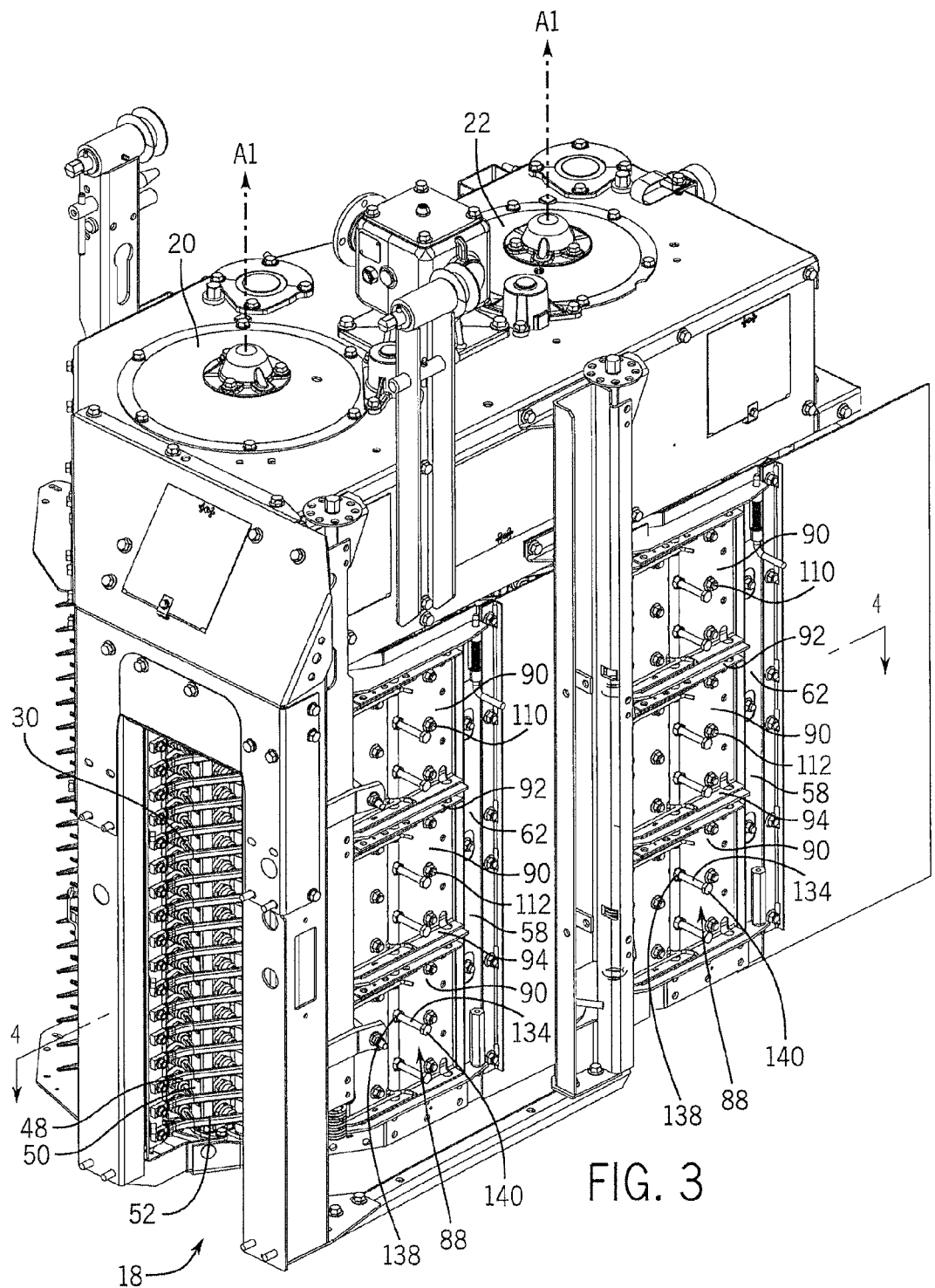
FIG. 3 is an opposite side perspective view thereof.

The picker head 14 may also include a front (or first) picking drum 20 and a rear (or second) picking drum 22 disposed along one side of the channel 18, as seen in FIGS. 2 and 3. The picking drums 20, 22 may each include a plurality of picker bars 24 disposed around the circumferences of the picking drums 20, 22. The picking drums 20, 22 may be vertically aligned about parallel axes A1, and the picker bars 24 may be disposed in parallel to each other and the drum axes A1. Each picker bar 24 may be operably coupled to the associated drum 20, 22 at its top end 26 and its bottom end 28 to be pivotal about picker bar axes A2 (see FIG. 7), which are parallel to the drum axes A1.

Figure 8:
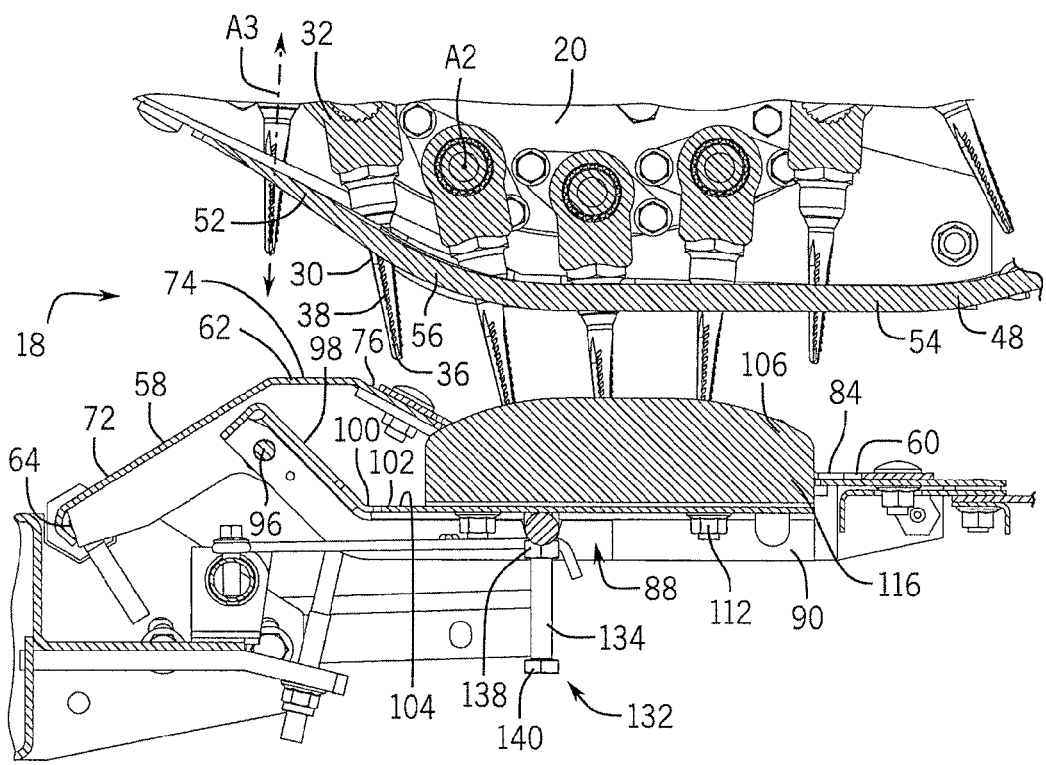
FIG. 8 is a detail of the section of FIG. 4.

A plurality of spindles 30 are disposed on each picker bar 24 with a proximal end 32 of the spindle 30 being located next to the picker bar 24. Each spindle 30 may have a conical body tapering to a distal end 36 and including one or more serrated barbs 38, as best seen in FIG. 8. In the illustrated embodiment, the spindles 30 are disposed substantially perpendicular to the picker bar 24 on which they are mounted, collectively in an array of columns and rows, and they may be configured to rotate about an axis A3 extending through the proximal 32 and distal 36 ends. The spindles 30 may be disposed at other non-perpendicular acute or obtuse angles relative to the picker bar 24 on which they are mounted.

Turning to FIG. 3, the rear drum 22 may be the same or similar to the front picking drum 20. For example, the front 20 and rear 22 drums may include the same number of picker bars 24 and spindles 30 per picker bar 24. However, the rear picking drum 22 may include a different number of picker bars 24 and/or a different number of spindles 30 per picker bar 24. In the illustrated example, the rear picking drum 22 may include fewer picker bars 24 (e.g., twelve are shown) than the front picking drum 20 (e.g., sixteen are shown) and the same number of spindles 30 per picker bar 24 (e.g., twenty are shown). Additionally, the front 20 and rear 22 drums may be configured to rotate at generally the same speed or at different speeds. In the illustrated example, the front picking drum 20 has a larger diameter than the rear picking drum 22, and the front picking drum 20 may rotate between about 140-150 r.p.m., and the rear drum 22 may rotate between about 160-170 r.p.m. In the illustrated example, the spindles 30 may be rotated at a constant or varied speed, such as about 4,500 r.p.m.

Figure 4:
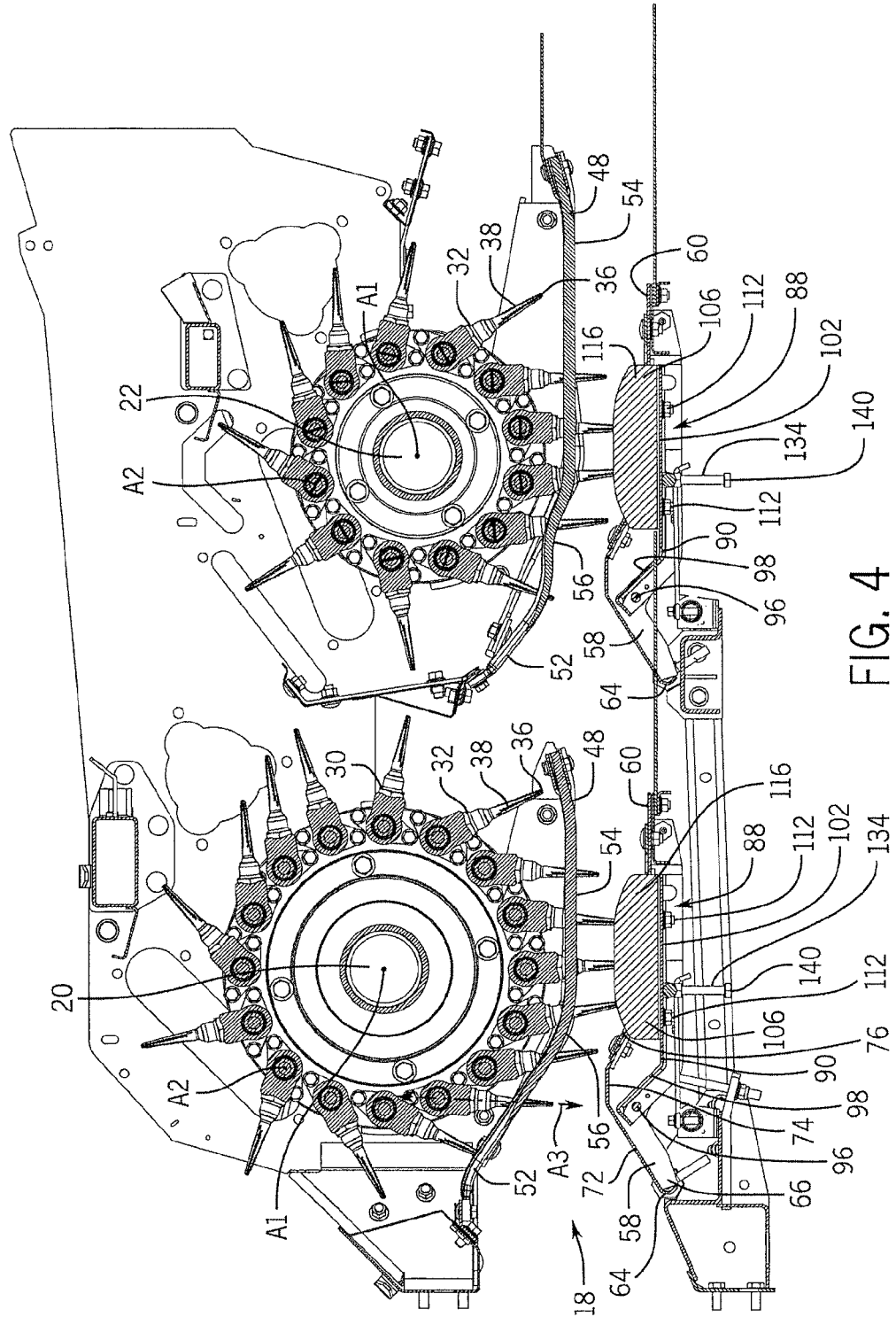
FIG. 4 is a top section view through line 4-4 in FIG. 3.

Referring to FIG. 4, the picker head 14 also may include a series or array of grid bars 48 for each drum 20, 22, which may be disposed between adjacent pairs of spindles 30. The grid bar array 48 may serve to keep plant material from passing through the channel 18 away from the picking drums 20, 22, while at the same time positioning the plant material so that the spindles 30 may interact more effectively with the plants to remove the cotton from the bolls. Thus, the grid bar arrays 48 may be located proximate the proximal ends 32 of the spindles 30 so that a majority of each spindle 30, including the serrated distal end 36, protrudes into the channel 18 beyond the grid bar arrays 48. The grid bars themselves may be aligned in a column, thereby forming rows of channels 50 between adjacent pairs of grid bars. Each spindle 30 may be configured to pass through a respective channel 50, such that one or both of each grid bar array 48 and the channels 50 may be disposed substantially perpendicular to the picker bars 24, or may otherwise create a path to the spindles 30 even if not substantially perpendicular to the picker bars 24. Each grid bar array 48 may have a leading segment 52 and a trailing segment 54, and the leading segment 52 may be configured to contour around a portion of a circumference of the picking drums 20, 22. Specifically, the leading segment 52 may be linear or curvilinear and may extend, e.g., between about ⅛ and about ¼ of the way around a circumference of each drum 20, 22. The trailing segment 54 may be disposed generally in line with a direction of the channel 18. (For example, the line may be a line tangent to the drum 20, 22 at a location where a radius of the drum 20, 22 is perpendicular to the direction of the channel 18. A transition 56 between the leading segment 52 and the trailing segment 54 may be at a location upstream from that tangent position.)

On the opposite side of the channel 18 as the picking drums 20, 22, the picker head 14 may include pressure plates 58, one for each drum 20, 22, which is configured to press the plant material passing through the channel 18 toward the picking drums 20, 22. Each pressure plate 58 may have a front (channel- and drum-facing) side 60 and a rear side 62. Each pressure plate 58 may also include or interface with a stop to limit the degree to which the plate is capable of traveling into the channel 18, for example, as described in detail below. The stop may be a mechanical structure physically preventing further movement of the pressure plate 58, or it may be a programmed limit position (e.g., in the case where movement of the pressure plates 58 is electronically controlled).

One or more torsion springs 68 may be disposed around a hinge 64. Each torsion spring 68 may have a spring end 70 that applies a force on the rear side 62 of the pressure plate 58 to bias the pressure plate 58 toward the channel 18. There may be at least one, and likely multiple, torsion springs 68 disposed along the hinge 64 to apply forces along the length of the scrapping plate assembly (discussed in detail below). For example, there may be a pair of torsion springs 68 for each scrapping plate, with the ends of those torsion springs 68 disposed near the upper and lower ends of the individual plates, in order to apply a more uniform compressive force across each plate and the assembly overall.

Figure 9:
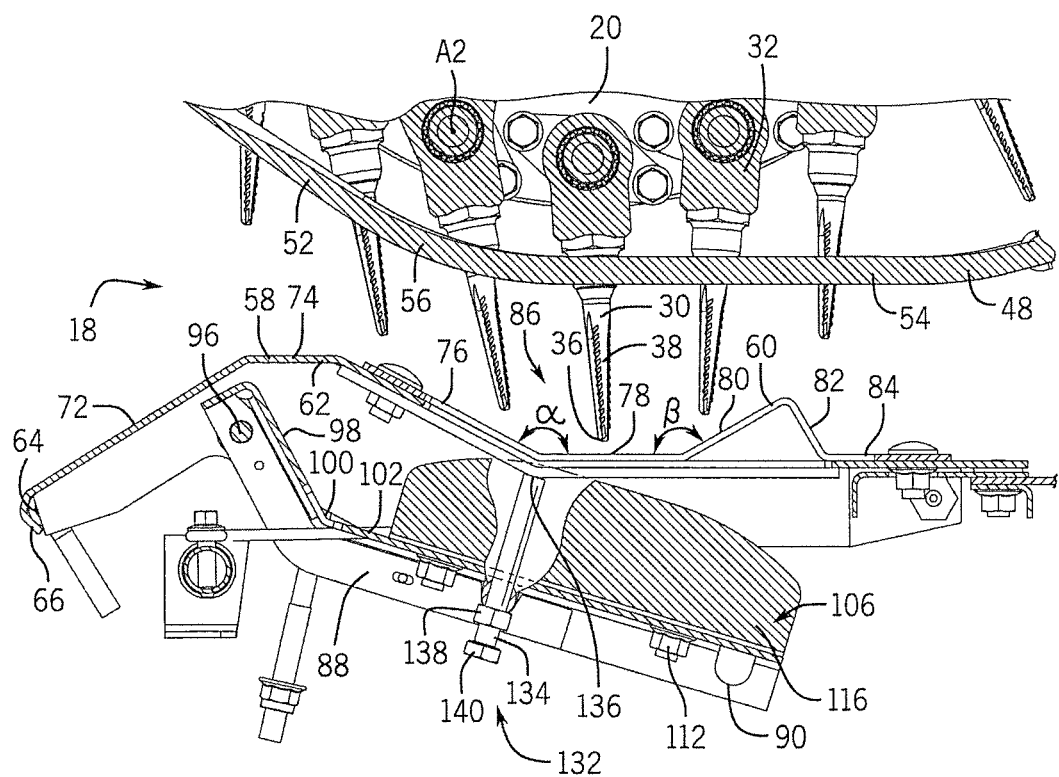
FIG. 9 is a partial cut-away detail of the section of FIG. 4, showing the scrapping arrangement disengaged.

As best seen in FIG. 9, each pressure plate 58 may include a first segment 72 extending rearward and inward (i.e., into and narrowing the channel 18, when viewed from the top) from the leading end 66, which may assist in funneling plant material into the channel 18. A second segment 74 may extend generally parallel to the direction of the channel 18, followed by third 76 and fourth 78 segments that, like the grid bar arrays 48, may be configured to contour around a portion of the circumference of the picking drums 20, 22. Thus, the third segment 76 may extend rearward and outward from the second segment 74, and the fourth segment 78 may extend generally parallel to the direction of the channel 18 (i.e., in a plane generally parallel to the plane tangent to the drum 20, 22 at that location). The fourth segment 78 may be located rearward into the channel 18 at a location that overlaps with the trailing segment 54 of the associated grid bar array 48, although the fourth segment 78 may be significantly shorter than the trailing segment 54. Further following the path of the picking drums 20, 22, the pressure plates 58 may each include a fifth segment 80 extending rearward and inward from the fourth segment, a sixth segment 82 extending rearward and outward, and a seventh segment 84 extending generally parallel to the direction of the channel 18. Each of these segments may be generally planar surfaces, although they may also be various concave, convex, angled, or other irregularly shaped surfaces. In addition, it will be understood that these directions refer to the pressure plates 58 as oriented in their configuration biased toward the picking drums 20, 22, and that they will change if the pressure plates 58 are hinged outward (e.g., due to plant material passing through the channel 18 and forcing the pressure plates 58 outward). The pressure plates 58 themselves may be substantially rigid such that the relative angles between pressure plate segments may not change when the pressure plates 58 are rotated outward. Further, the third 76 and fourth 78 segments may form an obtuse angle α with respect to one another, and the fourth 78 and fifth 80 segments may form an obtuse angle β with respect to one another. These two angles may differ, or as illustrated, they may be substantially the same such that the third 76, fourth 78, and fifth 80 segments combine to form a trough 86 having a flat bottom spaced away from the associated drum 20, 22 with angled sides that project toward the drum 20, 22. As the picking drums 20, 22 turn, the picker bars 24 rotate with the picking drums 20, 22 and also about their axes A2, causing columns of spindles 30 to enter the trough 86, moving toward the third segment 76, along the fourth segment 78, and away from the fifth segment 80 as they exit the trough 86.

Turning now to FIGS. 5-9, each picker head 14 may include one, and more likely a plurality, of scrapping plate assemblies 88 for each drum 20, 22. Each scrapping plate assembly 88 may include a door 90 pivotally coupled to the associated pressure plate 58 at a top edge 92 and bottom edge 94 about a second hinge 96. The door 90 may include a series of substantially planar surfaces, at least on a drum-facing side 104. For example, the door 90 may include a first substantially planar surface 98 extending from the hinge 96 rearward to a transition section 100 and a second substantially planar surface 102 extending from the transition section 100 rearward. The surface 98 also may extend outward from the hinge 96 and the surface 102 may be configured such that when the door 90 is hinged, the drum-facing side 104 is flush against, or parallel to, the rear side 62 of the pressure plate 58, as seen in FIG. 8.

Each door 90 may include one or more scrapping plates 106 on the drum-facing side 104 of surface 102. The scrapping plates 106 may be formed as a single piece with the door 90 or, alternatively, they may be separate elements coupled to the door 90, which may facilitate repair or replacement of the scrapping plates 106 in the event they become damaged or broken. Each scrapping plate may include one or more openings (e.g., spaced openings near the forwardmost and rearwardmost ends of the scrapping plate 106) configured to overlie matching openings 110 in the door 90 and to receive a fastener 112 to couple the scrapping plate 106 to the door 90. The scrapping plates 106 may be U-shaped with a base 114 and two ribs 116 forming a pocket 122 running in a direction of the channel 18 when the scrapping plates 106 are rotated into a use position.

Figure 7:
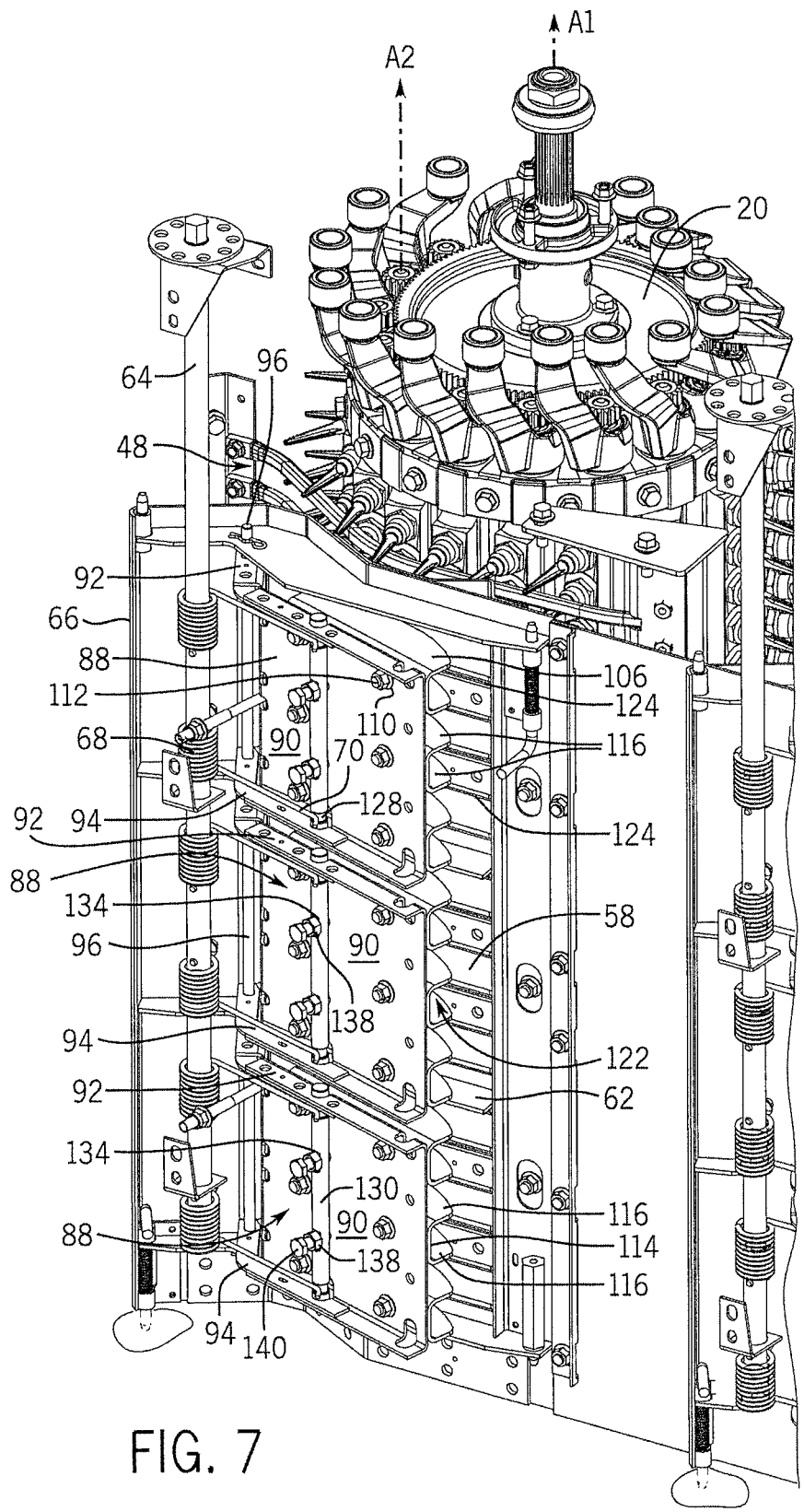
FIG. 7 is yet another partial perspective view of the cotton picker head, showing the scrapping arrangement disengaged.

The scrapping plates 106 may be formed of a rigid, but non-brittle material that resists both deformation and fracture during use. In one example, the scrapping plates 106 may be made of a metal, such as steel or aluminum. They may be formed as a unitary part, for example, using a casting process or bending or machining technique. Alternatively, the scrapping plates 106 may be fabricated from multiple pieces of metal, such by welding. Each scrapping plate 106 may be formed separately. Alternatively, a plurality of scrapping plates 106 may be formed as a single unit. For example, one door 90 of a scrapping plate assembly 88 may be configured to receive three scrapping plates 106, which may be formed as a single unit with the scrapping plates 106 disposed side-by-side, as seen in FIG. 7. There may be an equal number of scrapping plates 106 as there are spindles 30 on each picker bar 24. Alternatively, one or more spindles may not include a corresponding scrapping plate 106. For example, the bottom spindle 30 in each picker bar 24 in each drum 20, 22 may not have a corresponding scrapping plate 106.

As mentioned previously, each scrapping plate assembly 88 is pivotally coupled to the associated pressure plate 58.

Thus, each pressure plate 58 may include a plurality of openings 124 disposed inline with, and configured to permit passage of, the ribs 116 of each scrapping plate 106 as the scrapping plate assembly 88 is pivoted into position with the door 90 disposed alongside the pressure plate 58. As illustrated, the ribs 116 may be perpendicular to the base 114, and the openings 124 may be sized slightly wider than a thickness of the ribs 116 so as to permit free rotation of the ribs 116 into place. However, the ribs 116 may be angled (e.g., obtusely, relative to the base 114), requiring that the openings 124 be enlarged to account for the ribs 116 not traveling in parallel planes as the scrapping plate assembly 88 is rotated.

Figure 6:
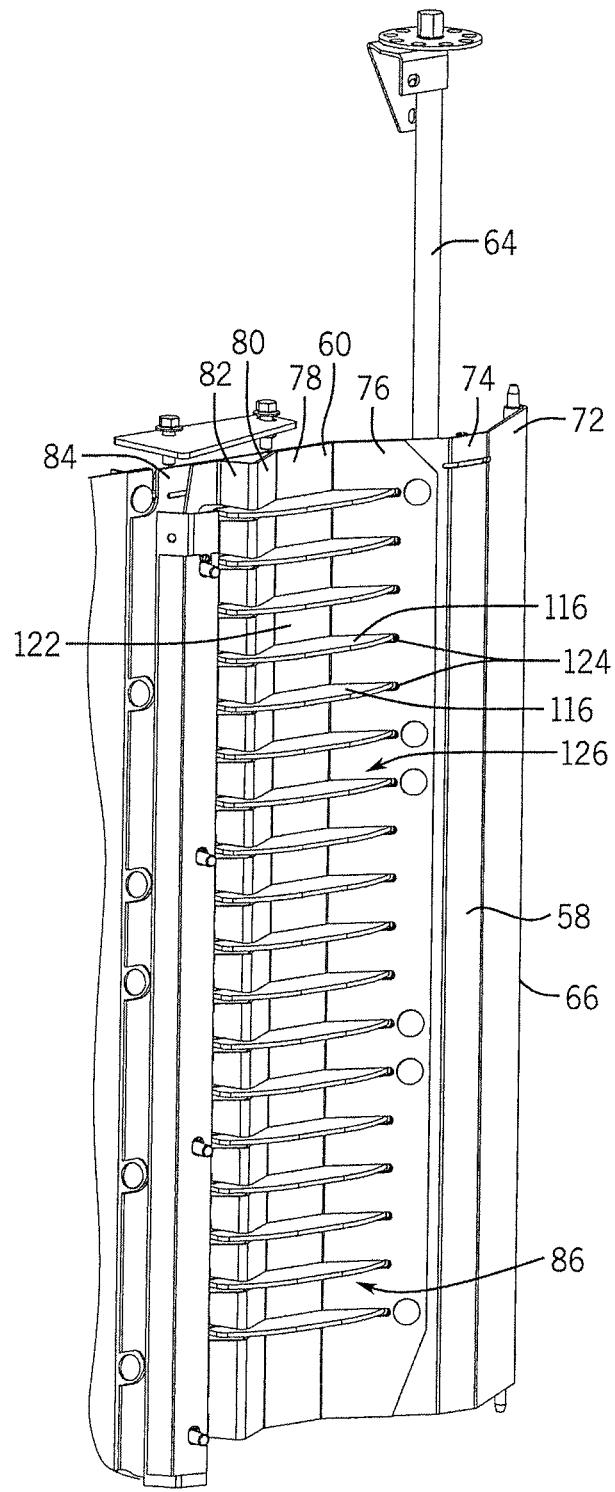
FIG. 6 is another perspective view of pressure plate and scrapping plates components.

The base 114 of each scrapping plate 106 may span multiple segments of the pressure plate 58 when rotated into position. Specifically, the scrapping plate 106 may span at least the angled third segment 76 and flat fourth segment 78, as can be seen by comparing FIGS. 8 and 9. Thus, the pockets 122 formed by the scrapping plates 106 may be modified by the pressure plate segments, forming a modified pocket 126, as best seen in FIG. 6. Specifically, whereas the pockets 122 may have a flat base 114, the modified pockets 126 may have a base that angles downwardly and then flattens out, since the base is formed by the third 76 and fourth 78 segments of the pressure plate 58. The base 114 of each scrapping plate 106 also may span a portion of the angled fifth segment 80, such that the base of the modified pocket 126 may reflect the orientation of that segment and angle back upwardly. Alternatively or additionally, the scrapping plates 106 may have a contoured base 114, which may follow the contour created by two or more of the third 76, fourth 78, and fifth 80 segments of the associated pressure plate 58. The openings 124 in the pressure plate 58 may be significantly wider than a width of their respective ribs 116 (e.g., being sized and oriented to receive portions of the contoured base 114), such that that base 114 forms a portion of the modified pocket 126. Accordingly, in any of these aspects, when the scrapping plate ribs 114 are inserted through the openings 124, the modified pocket 126 may be configured to generally follow the path of the spindles 30 as they rotate on the picker bars 24 about the drum 20, 22.

As mentioned above, a plurality of torsion springs 68 may be used to bias the scrapping plate assemblies 88 and/or pressure plates 58 toward the picking drums 20, 22. Each scrapping plate assembly 88, therefore, may form at least one bearing surface 128 for the spring end 70. Each bearing surface 128 may be an opening or depression configured to receive one of the spring ends 70, thereby retaining the spring end 70 in position and preventing the spring end 70 from dislodging or slipping.

Figure 5:
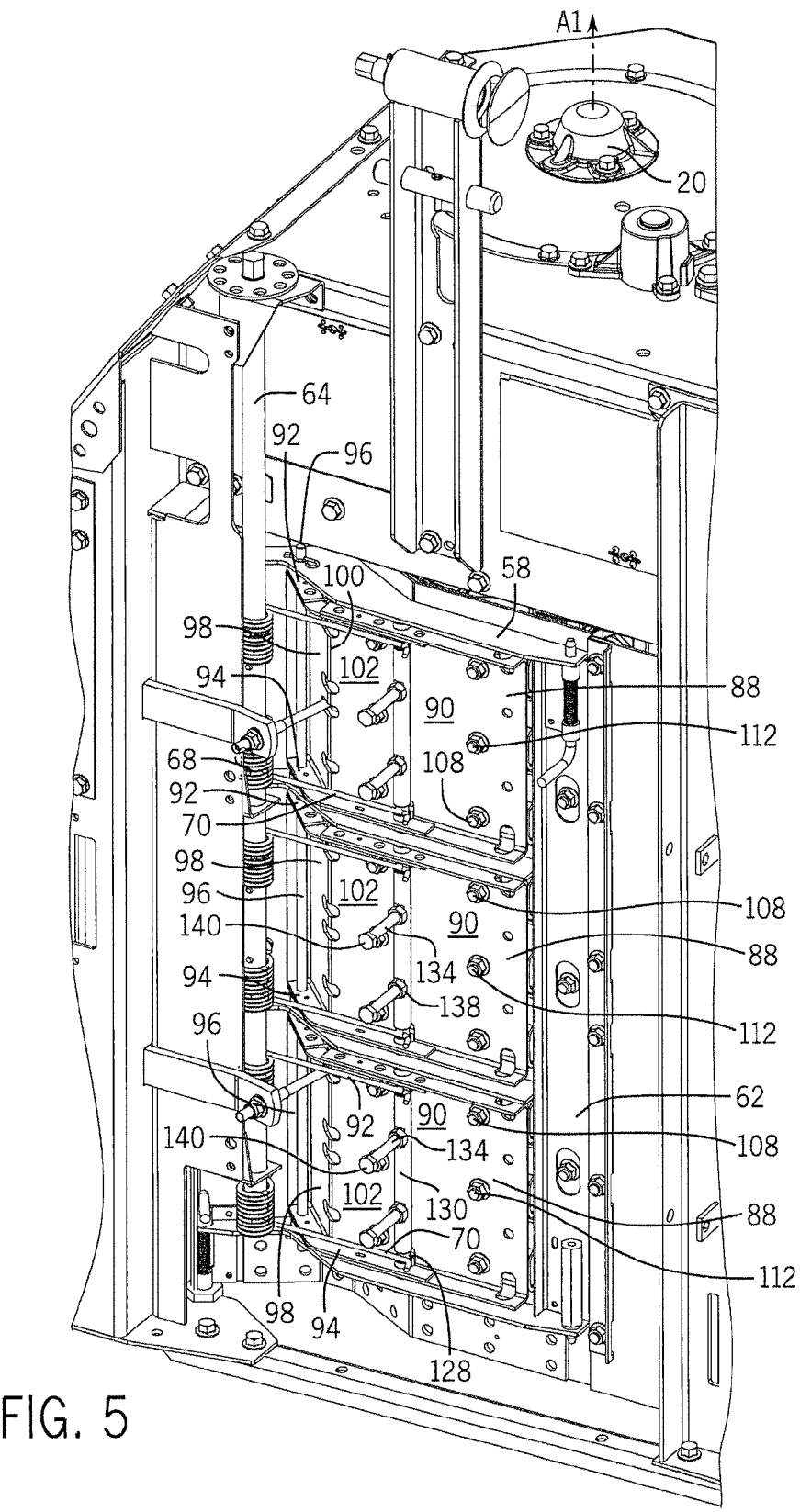
FIG. 5 is a partial perspective view of the cotton picker head, showing a scrapping arrangement in an engaged position.

In one example, as seen in FIGS. 5-7, each scrapping plate assembly 88 includes a post 130 coupled to and spanning the distance between the top 92 and bottom 94 edges. The post 130 may have a curved, camming surface (e.g., a cylindrical surface) at least on the side facing away from the scrapping plate assembly 88. The post 130 may also include a pair of depressions 128 proximate the edges that extend around at least a portion of the curved surface, thereby providing a smooth bearing surface for the spring ends 70, and to facilitate sliding of the spring ends 70 along the depressions 128 as the scrapping plate assembly 88 rotates.

Although the torsion springs 68 may bias each scrapping plate assembly 88 and pressure plate 58 toward the picking drums 20, 22, as seen in FIGS. 5 and 8, the picker head 14 also may be configured without the scrapping plates 106 protruding through the openings 124. Thus, the scrapping plate assembly 88 may be rotated about the hinge 96 into a second configuration, as seen in FIGS. 7 and 9. A holding device 132 may retain the scrapping plate assembly 88 in this second configuration, resisting the biasing force applied by the torsion springs 68.

In the illustrated example, the holding device 132 may include at least one adjustable post 134 protruding through the post 130 and/or the door 90 of the scrapping plate assembly 88. The adjustable post 134 may include a distal end 136 that bears against a rear side 62 of the pressure plate 58. Threading on the adjustable post 134 may engage internal threading in the opening in the post 130 in order to set an amount of the adjustable post 134 that protrudes past the drum-facing side 104 of the scrapping plate door 90.

The holding device 132 also may include a stop 138, such as a jam nut on the rear facing side 105 of the door 90, that is rotatable about the threaded portion. The adjustable post 134 may take the form of a bolt, and its proximal end may include a bearing surface, such as a head 140 preventing the jam nut from being over loosened and rotating off the post 130. Thus, the adjustable post 134 may be rotated with its threading setting a scrapping plate door standoff height. Once that height is achieved, the jam nut may be tightened against the post 130, preventing further rotation of the adjustable post 134.

In this manner, the holding device 132 may permit incremental adjustment of the scrapping plate assemblies 88 across the range of full-engagement to full-disengagement. The scrapping plate assemblies 88 also then may rotate through a predetermined range of motion (e.g., between about 25-30 degrees). The range of motion is large enough to ensure that the scrapping plates 106 can be withdrawn completely from the drum-facing side 104 of the scrapping plate doors 90, but not so large as to include unnecessary rotatability. For example, the scrapping plate doors 90 may not need to continue rotating once they are withdrawn completely, thus setting an upper limit for the degree of rotation. The holding device 132 may be configured to facilitate discrete or incremental adjustment.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. In a cotton picking machine with one or more rotating picking drums having a plurality of rotating picker spindles, a scrapping arrangement, comprising:
   at least one pressure plate mounted to pivot with respect to an associated drum of the one or more picking drums, the at least one pressure plate having at least one slot; and
   at least one scrapping plate pivotally mounted with respect to the at least one pressure plate, the at least one scrapping plate having at least one rib extending toward the associated drum, the at least one rib configured to pass through the at least one slot in the at least one pressure plate.

2. The scrapping arrangement of claim 1, wherein each of the at least one scrapping plate is an assembly including:
   a door pivotally mounted to an associated pressure plate of the at least one pressure plate; and
   a plate member having the at least one rib and mounted to the door.

3. The scrapping arrangement of claim 2, wherein the plate member has a plurality of the ribs defining at least one channel therebetween; and
   wherein the associated pressure plate has a plurality of the slots, and wherein the at least one channel is sized to receive at least one of the picker spindles when the ribs are disposed in the slots.

4. The scrapping arrangement of claim 2, wherein the assembly includes an adjustment mechanism for setting a pivot angle of the scrapping plate with respect to the associated pressure plate.

5. The scrapping arrangement of claim 4, wherein the adjustment mechanism includes an elongated post adjustably coupled to the door.

6. The scrapping arrangement of claim 2, wherein the assembly includes a biasing member biasing the scrapping plate toward the associated pressure plate.

7. The scrapping arrangement of claim 1, wherein one pressure plate is associated with each picking drum and extending in a direction of a length of the associated drum; and
   wherein a plurality of the scrapping plates are associated with each picking drum and arranged along a length of the associated pressure plate.

8. The scrapping arrangement of claim 7, wherein each scrapping plate is pivotal with respect to the associated pressure plate independent of the other scrapping plates.

9. The scrapping arrangement of claim 8, wherein each scrapping plate is an assembly including:
   a door pivotally mounted to the associated pressure plate; and
   a plate member having the at least one rib and mounted to the door.

10. The scrapping arrangement of claim 9, wherein the plate member has a plurality of the ribs defining at least one channel therebetween;
    wherein the associated pressure plate has a plurality of the slots; and
    wherein the at least one channel is sized to receive at least one of the picker spindles when the ribs are disposed in associated slots.

11. The scrapping arrangement of claim 10, wherein the assembly includes an adjustment mechanism for setting a pivot angle of the scrapping plate with respect to the associated pressure plate; and
    wherein the adjustment mechanism includes an elongated post adjustably coupled to the door.

12. The scrapping arrangement of claim 11, wherein the adjustment mechanism is configured to locate the door in a first position in which none of the ribs extend through the associated slots in the associated pressure plate and a second position in which the ribs extend through the associated slots in the associated pressure plate.

13. The scrapping arrangement of claim 9, wherein the assembly includes a biasing member biasing the scrapping plate toward the associated pressure plate.

14. In a cotton picking machine with one or more rotating picking drums having a plurality of rotating picker spindles, a scrapping arrangement, comprising:
    a pressure plate mounted to pivot with respect to an associated drum of the one or more picking drums, the pressure plate arranged to extend in a direction of a length of the associated drum and having a plurality of slots spaced apart from one another in the length direction; and
    a plurality of scrapping plates pivotally mounted with respect to the pressure plate, each of the scrapping plates having at least one rib extending toward the associated drum and configured to pass through the slots in the pressure plate.

15. The scrapping arrangement of claim 14, wherein each scrapping plate is pivotal with respect to the pressure plate independent of the other scrapping plates.

16. The scrapping arrangement of claim 14, further including an adjustment mechanism coupled to one or more of the scrapping plates for adjusting an angular position of one or more of the scrapping plates with respect to the pressure plate, including a first position in which none of the ribs extend through the slots in the pressure plate and a second position in which the ribs extend through the slots in the pressure plate.

17. The scrapping arrangement of claim 14, wherein each scrapping plate is an assembly including:
    a door pivotally mounted to the pressure plate; and
    a plate member having the at least one rib and mounted to the door.

18. In a cotton picking machine with one or more rotating picking drums having a plurality of rotating picker spindles, a scrapping arrangement, comprising:
    a pressure plate mounted to pivot with respect to an associated drum of the one or more picking drums, the pressure plate arranged to extend in a direction of a length of the associated drum and having a plurality of slots spaced apart from one another in the length direction; and
    a plurality of scrapping plates pivotally mounted with respect to the pressure plate, each of the scrapping plates being an assembly including:
        a door pivotally mounted to the pressure plate; and
        a plate member mounted to the door and having at least one rib extending toward the associated drum and configured to pass through the slots in the pressure plate.

19. The scrapping arrangement of claim 18, wherein each scrapping plate is pivotal with respect to the pressure plate independent of the other scrapping plates.

20. The scrapping arrangement of claim 18, further including an adjustment mechanism coupled to one or more of the scrapping plates for adjusting an angular position of one or more of the scrapping plates with respect to the pressure plate, including a first position in which none of the ribs extend through the slots in the pressure plate and a second position in which the ribs extend through the slots in the pressure plate.

* * * * *